US010572373B2

(12) United States Patent
Hanif et al.

(10) Patent No.: US 10,572,373 B2
(45) Date of Patent: *Feb. 25, 2020

(54) AUTOMATED TEST GENERATION FOR MULTI-INTERFACE AND MULTI-PLATFORM ENTERPRISE VIRTUALIZATION MANAGEMENT ENVIRONMENT

(71) Applicant: INTERNATIONAL BUSINESS MACHINES CORPORATION, Armonk, NY (US)

(72) Inventors: Tariq Hanif, Lagrangeville, NY (US); Tin H. To, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,757

(22) Filed: Apr. 20, 2017

(65) Prior Publication Data

US 2018/0307574 A1 Oct. 25, 2018

(51) Int. Cl.
*G06F 11/36* (2006.01)
*G06F 11/22* (2006.01)
(Continued)

(52) U.S. Cl.
CPC ...... *G06F 11/3688* (2013.01); *G06F 11/1497* (2013.01); *G06F 11/165* (2013.01);
(Continued)

(58) Field of Classification Search
CPC ............ G06F 11/3692; G06F 11/3684; G06F 11/3688; G06F 11/1497; G06F 11/1629;
(Continued)

(56) References Cited

U.S. PATENT DOCUMENTS 5,513,315 A 4/1996 Tierney et al.
5,600,789 A 2/1997 Parker et al.
(Continued)

FOREIGN PATENT DOCUMENTS

CN 103475538 A 12/2013

OTHER PUBLICATIONS

Disclosed Anonymously, "System and Method for Assigning Test Priority in Cloud Environment", IPCOM000242989D, Sep. 6, 2015, pp. 1-5.

(Continued)

*Primary Examiner* — Paul Contino
(74) *Attorney, Agent, or Firm* — Cantor Colburn LLP; William Kinnaman

(57) ABSTRACT

Embodiments for automated testing of a virtualization management system are described. An example computer-implemented method for automated testing of a virtualization management system includes sending, by a test server, a test case to a plurality of instances of the system under test, the test case sent to each instance of the system under test via each interface from a plurality of interfaces supported by the system under test. The method further includes, for each instance of the system under test, performing multi-interface comparison. The comparison includes comparing, by the test server, responses to the test case from each of the interfaces. The method also includes in response to the responses from each of the interfaces being identical, storing the responses in an instance-response file corresponding to the instance. The method also includes reporting, by the test server, an error in response to the responses from each interface not being identical.

7 Claims, 12 Drawing Sheets

(51) Int. Cl.
| | |
|---|---|
| *G06F 11/34* | (2006.01) |
| *G06F 11/14* | (2006.01) |
| *G06F 11/16* | (2006.01) |
| *G06F 11/18* | (2006.01) |

(52) U.S. Cl.
CPC ...... *G06F 11/1629* (2013.01); *G06F 11/1641* (2013.01); *G06F 11/183* (2013.01); *G06F 11/187* (2013.01); *G06F 11/2221* (2013.01); *G06F 11/2294* (2013.01); *G06F 11/3457* (2013.01); *G06F 11/3684* (2013.01); *G06F 11/3692* (2013.01)

(58) Field of Classification Search
CPC ............. G06F 11/1641; G06F 11/2221; G06F 11/3457; G06F 9/4533; G06F 11/183–188; G06F 11/165
See application file for complete search history.

(56) References Cited

U.S. PATENT DOCUMENTS

| | | | |
|---|---|---|---|
| 5,790,841 A | 8/1998 | Scherer et al. | |
| 6,002,992 A | 12/1999 | Pauwels et al. | |
| 6,452,411 B1* | 9/2002 | Miller | G01R 31/31905 324/754.07 |
| 6,480,978 B1* | 11/2002 | Roy | G01R 31/31905 714/724 |
| 6,662,312 B1 | 12/2003 | Keller et al. | |
| 6,668,362 B1 | 12/2003 | McIlwain et al. | |
| 7,089,534 B2 | 8/2006 | Hartman et al. | |
| 7,165,191 B1 | 1/2007 | Vakrat | |
| 7,240,316 B2 | 7/2007 | Regnier | |
| 7,401,259 B2 | 7/2008 | Bhowmik et al. | |
| 7,805,698 B1 | 9/2010 | Ferguson et al. | |
| 7,848,899 B2* | 12/2010 | Lai | G01R 31/31704 324/537 |
| 8,095,841 B2* | 1/2012 | Kemmerling | G01R 31/318511 714/736 |
| 8,321,839 B2 | 11/2012 | Slone et al. | |
| 8,572,437 B2 | 10/2013 | Chang et al. | |
| 8,762,959 B2 | 6/2014 | Singonahalli et al. | |
| 8,862,950 B1 | 10/2014 | Ginsberg et al. | |
| 9,075,918 B1 | 7/2015 | Chandra et al. | |
| 9,225,776 B1 | 12/2015 | Kochura | |
| 9,262,396 B1 | 2/2016 | Rodriguez Valadez et al. | |
| 9,424,169 B1* | 8/2016 | Galburt | G06F 11/3692 |
| 9,720,795 B2 | 8/2017 | Faraj | |
| 9,760,567 B1* | 9/2017 | Ourfalian | G06F 17/289 |
| 9,785,532 B2 | 10/2017 | Faraj | |
| 9,792,194 B2 | 10/2017 | Faraj | |
| 9,977,851 B2 | 5/2018 | Averill, III et al. | |
| 10,054,634 B2* | 8/2018 | Chi | G11C 29/56 |
| 10,223,487 B2 | 3/2019 | Averill, III et al. | |
| 10,248,749 B2 | 4/2019 | Averill, III et al. | |
| 2003/0103310 A1 | 6/2003 | Shirriff | |
| 2004/0041827 A1 | 3/2004 | Bischof et al. | |
| 2005/0071447 A1 | 3/2005 | Masek et al. | |
| 2005/0160433 A1* | 7/2005 | Lambert | G06F 11/3696 719/328 |
| 2006/0200789 A1 | 9/2006 | Rittman | |
| 2006/0212540 A1* | 9/2006 | Chon | G06F 11/261 709/218 |
| 2007/0266137 A1* | 11/2007 | Malik | H04L 43/50 709/223 |
| 2007/0282556 A1 | 12/2007 | Achkar et al. | |
| 2008/0126918 A1* | 5/2008 | Boardman | G06F 11/3664 714/819 |
| 2009/0138853 A1 | 5/2009 | Orrick | |
| 2009/0313596 A1 | 12/2009 | Llippmann et al. | |
| 2010/0058275 A1 | 3/2010 | Polomik et al. | |
| 2011/0145643 A1* | 6/2011 | Kumar | G06F 11/263 714/33 |
| 2012/0174067 A1 | 7/2012 | Locker et al. | |
| 2013/0007772 A1* | 1/2013 | Arcudi | G06F 11/3692 719/320 |
| 2013/0191105 A1 | 7/2013 | Abdirashid et al. | |
| 2013/0332774 A1* | 12/2013 | Sinanoglu | G06F 11/263 714/32 |
| 2014/0026122 A1 | 1/2014 | Markande et al. | |
| 2014/0109052 A1 | 4/2014 | Tempel et al. | |
| 2014/0236525 A1* | 8/2014 | Chan | G01R 31/31907 702/119 |
| 2014/0236526 A1* | 8/2014 | Frediani | G01R 31/2834 702/119 |
| 2014/0237292 A1* | 8/2014 | Chan | G06F 11/2733 714/32 |
| 2014/0244204 A1* | 8/2014 | Frediani | G01R 31/31907 702/119 |
| 2014/0359579 A1 | 12/2014 | Cavanaugh et al. | |
| 2015/0026665 A1* | 1/2015 | Chen | G06F 11/3688 717/124 |
| 2015/0028908 A1* | 1/2015 | Kushnick | G06F 11/2221 324/750.05 |
| 2015/0227449 A1 | 8/2015 | Kuang et al. | |
| 2015/0339216 A1 | 11/2015 | Wade | |
| 2016/0154729 A1 | 6/2016 | Prodan et al. | |
| 2016/0274890 A1 | 9/2016 | Sternfeld et al. | |
| 2016/0275004 A1 | 9/2016 | Cohen | |
| 2017/0010304 A1* | 1/2017 | Jang | G01R 31/31926 |
| 2017/0010874 A1 | 1/2017 | Rosset et al. | |
| 2017/0039133 A1 | 2/2017 | Rai et al. | |
| 2017/0060713 A1 | 3/2017 | Wang | |
| 2017/0123951 A1 | 5/2017 | Abdirashid et al. | |
| 2017/0123965 A1 | 5/2017 | Abdirashid et al. | |
| 2018/0046741 A1 | 2/2018 | Averill, III et al. | |
| 2018/0165185 A1* | 6/2018 | Boshev | G06F 11/3692 |
| 2018/0357154 A1 | 12/2018 | Dolby et al. | |

OTHER PUBLICATIONS

List of IBM Patents or Patent Applications Treated as Related; (Appendix P), Filed Nov. 8, 2017; 2 pages.

Tariq Hanif et al."Automated Test Generation for Multi-Interface and Multi-Platform Enterprise Virtualization Management Environment", U.S. Appl. No. 15/806,428, filed Nov. 8, 2017.

Balasubramanian et al. Functional test automation method for e.g. device management application, involves logging test step execution and results in file, and updating test status and test logs in test repository against test. RD54402A. Aug. 10, 2009.

Disclosed Anonymosly, "A Method and System to Recommend Tools in Testing Cloud," IP.com No. 00021366, IP.com Electronic Publication, Dec. 7, 2011, pp. 1-10.

Disclosed Anonymously, "Method and System for Implementing Hierarchical Scaling Pattern Technique in Cloud Computing Environment," IP.com No. 000236101, IP.com Electronic Publication, Apr. 4, 2014, pp. 1-2.

Matsunaga, Andrea et al. "CloudBLAST: Combining MapReduce and Virtualization on Distributed Resources for Bioinformatics Applications," Fourth IEEE International Conference on eScience, pp. 1-8.

Mohammad Abdirashid et al., "Automated Test Generation for Multi-Interface Enterprise Virtualization Management Environment", U.S. Appl. No. 14/927,583, filed Oct. 30, 2015.

Mohammad Abdirashid et al., "Automated Test Generation for Multi-Interface Enterprise Virtualization Management Environment", U.S. Appl. No. 15/069,211, filed Mar. 14, 2016.

Reddy, P. Vijay Vardhan et al. "Evaluation of Different Hypervisors Performance in the Private Cloud with SIGAR Framework," International Journal of Advanced Computer Science and Applications vol. 5, No. 2, 2014, pp. 1-7.

Ruivo, et al. "Exploring Infiniband Hardware Virtualization in OpenNebula towards Efficient High-Performance Computing," Scientific Computing Division, Fermi National Accelerator Laboratory, 2014, pp. 1-6.

Tariq Hanif et al."Automated Test Generation for Multi-Interface and Multi-Platform Enterprise Virtualization Management Environment", U.S. Appl. No. 15/492,757, filed Apr. 20, 2017.

(56) References Cited

OTHER PUBLICATIONS

The University of Utah, "Design Compiler—Basic Flow," "Synopsys design compiler Cadence Encounter Digital Implementation System (EDI)," http://www.eng.utah.edu/~cs6710/slides/cs6710-syn-socx6.pdf, Oct. 23, 2006, pp. 1-12.

\* cited by examiner

AUTOMATED TEST GENERATION FOR MULTI-INTERFACE AND MULTI-PLATFORM ENTERPRISE VIRTUALIZATION MANAGEMENT ENVIRONMENT

BACKGROUND

The present application relates to automated testing, and more specifically, to automated testing for a virtualization management environment.

Testing often consumes a considerable amount of time when developing software. Typically, a programming background is required to create automated tests for software applications, application programming interfaces, software development kits, web services and websites. Most test applications require users to learn a specific language to write tests. In addition, when a new instance (build, version, etc.) of a product is developed, new or modified tests are required to ensure that the new instance of the product performs correctly. Further, the complexity and amount of work associated with system level testing of multi-interface components in a cloud-based computing infrastructure renders manual testing to become inefficient and costly as the system components and complexity increases.

SUMMARY

According to one or more embodiments of the present invention, a computer-implemented method for automated testing of a virtualization management system is described. The method includes sending, by a test server, a test case to a plurality of instances of the system under test, the test case sent to each instance of the system under test via each interface from a plurality of interfaces supported by the system under test. The method further includes, for each instance of the system under test, performing multi-interface comparison. The comparison includes comparing, by the test server, responses to the test case from each of the interfaces. The method also includes in response to the responses from each of the interfaces being identical, storing the responses in an instance-response file corresponding to the instance. The method also includes reporting, by the test server, an error in response to the responses from each interface not being identical.

According to one or more embodiments of the present invention, a system for automated testing of a virtualization management system includes a memory and a processor. The processor sends a test case to a plurality of instances of the system under test, the test case sent to each instance of the system under test via each interface from a plurality of interfaces supported by the system under test. Further, for each instance of the system under test, the processor performs multi-interface comparison. The comparison includes comparing responses to the test case from each of the interfaces. In response to the responses from each of the interfaces being identical, the processor stores the responses in an instance-response file corresponding to the instance. The processor also reports an error in response to the responses from each interface not being identical.

According to one or more embodiments of the present invention, a computer program product for automated testing of a virtualization management system includes a computer readable storage medium. The computer readable storage medium has program instructions stored therein. The program instructions are executable by a processing circuit to cause the processing circuit to send a test case to a plurality of instances of the system under test, the test case sent to each instance of the system under test via each interface from a plurality of interfaces supported by the system under test. The program instructions further cause the processing circuit to, for each instance of the system under test, perform multi-interface comparison, which includes comparing responses to the test case from each of the interfaces. In response to the responses from each of the interfaces being identical, the responses are stored in an instance-response file corresponding to the instance. The program instructions further cause the processing circuit to report an error in response to the responses from each interface not being identical.

BRIEF DESCRIPTION OF THE DRAWINGS

The examples described throughout the present document may be better understood with reference to the following FIGS. and description. The components in the FIGS. are not necessarily to scale. Moreover, in the FIGS., like-referenced numerals designate corresponding parts throughout the different views.

DETAILED DESCRIPTION

Figure 1:
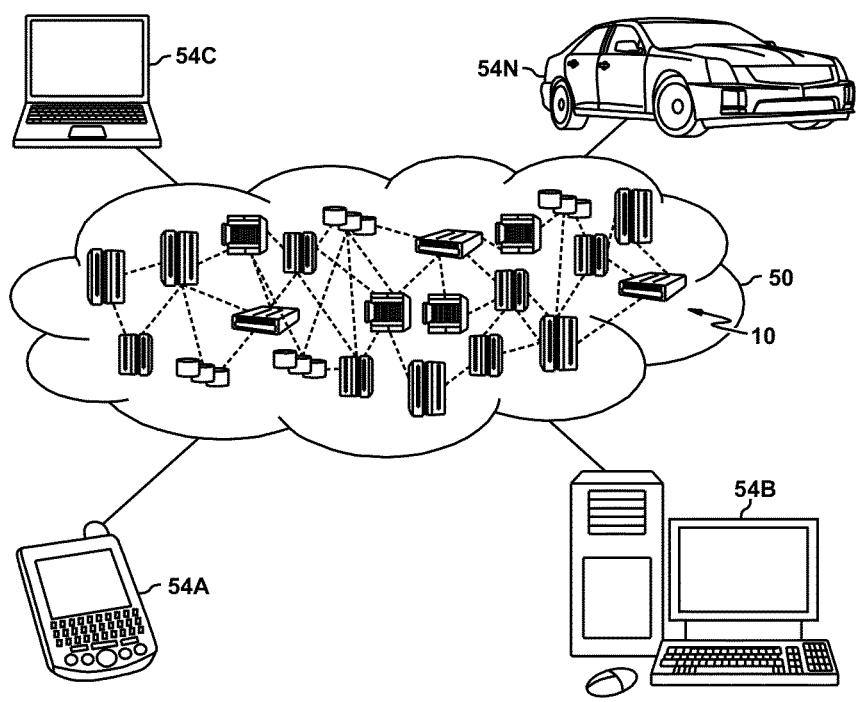
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
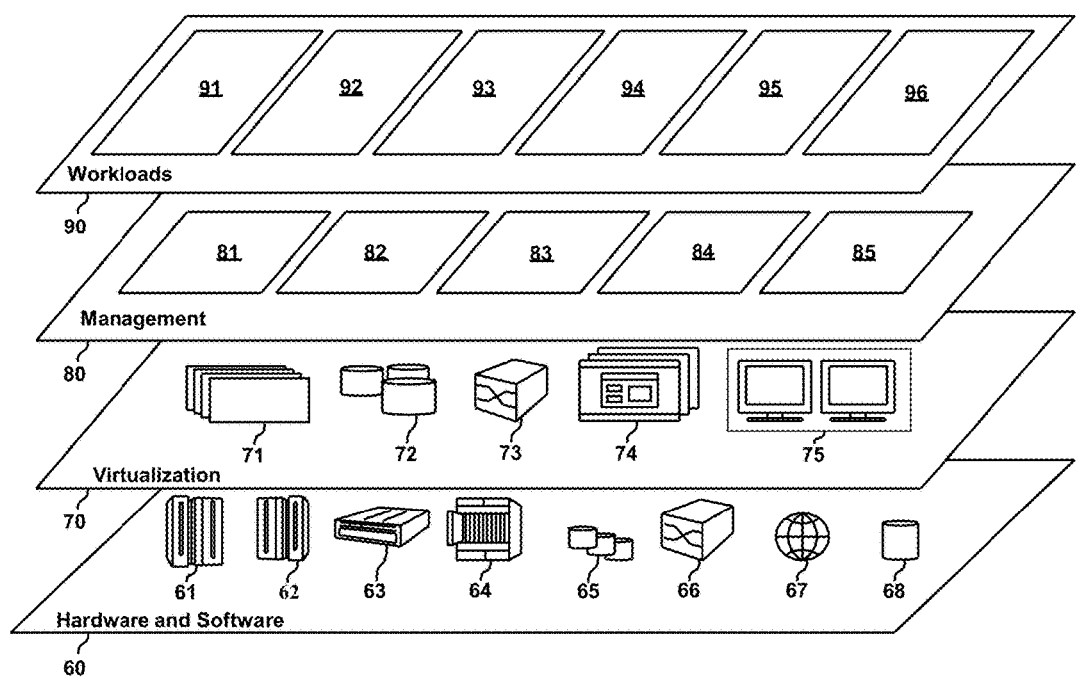
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated testing 96.

Disclosed here are technical solutions for automated testing of a multi-interface virtualization management system, such as for an enterprise. The virtualization management system facilitates the enterprise, such as an organization, to deploy cloud-based computing management based dynamic infrastructure. The complexity and amount of work associated with system level testing of a multi-interface virtualization management system in a cloud-based computing infrastructure renders manual testing to become inefficient and costly as the system components and complexity increases. Further, the redundancy of execution time gets multiplied by the number of interfaces of the virtualization management system. For example, the system may have a Graphical User Interface (GUI), an Application Programming Interface (API), a Command Line Interface (CLI), or any other interface or a combination thereof. The technical solutions described herein overcome such limitations of manual testing and shorten the test cycle time, by providing a robust and automated multi-interface testing.

Further yet, an automated testing system that supports multiple interfaces, may have to support multiple platforms, such as operating systems, hardware, and a combination thereof. For example, a cloud computing system may execute on multiple cloud computing platforms, which may each have a respective operating system, such as LINUX™, WINDOWS™, Z/OS™, and so on. Further, each of the cloud computing platform may be executing on different hardware such as IBM™ Z SYSTEM™, CLEARPATH™, and so on. Further, each cloud computing platform can run several operating systems at once using virtual machines as if they were running on different computers. As a result, the automated test cases have to be executed against the system running on each of the supported combination of platforms, which becomes inefficient and redundant. The one or more embodiments of the present invention described herein emulate and test by executing an arbitrary mixture of multi-interface, multi-platform virtualization management functionalities in a heterogeneous cloud-based infrastructure.

Figure 3:
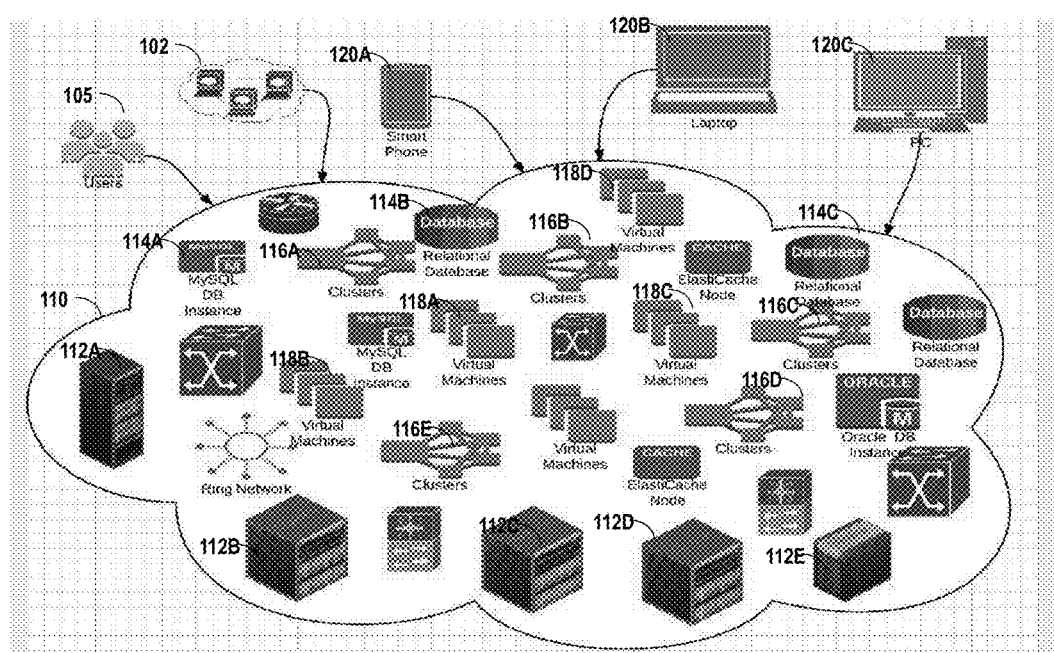
FIG. 3 illustrates an example virtualization management system in accordance with one or more embodiments of the present invention.

FIG. 3 illustrates an example virtualization management system 102, according to one or more embodiments of the present invention. In one or more examples, the system 102 is a heterogeneous cloud-based infrastructure. The virtualization management system 102 provides a single point of management across multiple types of system platforms and their virtualization technologies. For example, as illustrated, the virtualization management system 102 manages a cloud-based infrastructure 110 of an enterprise. The cloud-based infrastructure 110 is a cloud computing environment 50 as described herein. For example, The cloud-based infrastructure 110, depending on the size of the enterprise, includes one or more data servers 112A-112E, one or more database instances 114A-114C, one or more virtual machines 118A-118D, one or more clusters 116A-116E, and one or more computer network nodes, among other components. For example, the data servers 112A-112E includes an enterprise email server, a document server, a computer server, or any other server that provides data and/or computation functionality to users. The database instances 114A-114C includes an instance of a customer database, an instance of payroll database, or any other database. The clusters 116-116E includes physical or virtual computer clusters. For example, the clusters includes a HADOOP™ cluster, a SQL SERVER™ cluster, a MICROSOFT WINDOWS SERVER™ cluster, or any other cluster. The virtual machines 118-118D include a virtual machine that is tasked for a particular operation, a virtual machine that is assigned to a particular user, or any other type of virtual machines.

Users 105 of the cloud infrastructure 110, access the cloud infrastructure 110 from within or from outside the cloud infrastructure 110. For example, a user may access the resources or components within the cloud infrastructure 110 via the virtual machine 118A. Alternatively, a user may access the components within the cloud infrastructure 110 via a client-device, such as one from client-devices 120A-120C. The client-devices includes a communication device such as a laptop, a tablet computer, a smartphone, a mobile phone, a desktop computer, or any other communication device.

The cloud infrastructure 110 may communicate with another cloud infrastructure. In an example, a user may request communication between the cloud infrastructure 110 and the other cloud infrastructure, for example, to copy or move data from one place to another. The other cloud infrastructure includes similar or different components in comparison to the cloud infrastructure 110.

Thus, the virtual management system 120 facilitates communication with the cloud infrastructure 110 to varying types of devices and for various purposes. Accordingly, to facilitate communications for the various purposes, the virtual management system 102 provides multiple interfaces to communicate with the cloud infrastructure 110, such as a GUI, an API, a CLI, or any other interface or a combination thereof. For example, consider a cloud infrastructure of an organization that sells goods via the web. The data servers for the organization include information about goods for sale. A user, such as a customer, may access the data via the GUI. Another user, such as an employee of the organization may access the data via an API, such as to change the data programmatically. In another example, another user, such as another server from an advertiser may access the data via the API to access and post the information on a website or as a search result. In addition, a network administrator may access the data server via the CLI, for example, to determine the integrity of the server. Thus, the virtualization management system 130 provides multiple interfaces, at least three interfaces to facilitate communication.

In addition, the virtualization management system 102 facilitates managing the cloud infrastructure 110 from an administrative perspective. For example, the virtualization management system 102 manages images of Operating Systems (OS) that may be deployed across the cloud infrastructure 110. For example, the virtualization management system 102 orchestrates emulating scaled up versions of the cloud infrastructure 110 that supports arbitrary concurrent multi-end users. In an example, the virtualization management system 102 manages the OS images deployed throughout the cloud infrastructure 110. Managing the OS images includes deploying guest OS images, capturing guest OS images, importing virtual appliances (guest OS image), viewing or listing guest OS images, deleting guest OS images, and other such operations and a combination thereof. The virtualization management system 102 further scale and stress tests the image management repository by facilitating revision control, rebase (re-image), and advanced search for Virtual Appliances (VA's).

The virtualization management system 102 further manages system pools (clusters) in the cloud infrastructure 110. For example, the virtualization management system 102 creates, lists, removes, and edits data servers and storage system pools (storage clusters). The virtualization management system 102 also deploys images into server system pools by adding, listing, removing, and editing server hosts from server system pools (server clusters). In addition, the virtualization management system 102 adds, lists, removes, and edits storage subsystem hosts from storage system pools (storage clusters). The virtualization management system 102 also monitors server and storage system pools. Based on the monitoring, the virtualization management system 102 creates, lists, removes, and edits workloads of the clusters. For example, the virtualization management system 102 set workloads to High Availability (HA) and have automatically placed jobs in system pools.

In addition, the virtualization management system 102 may facilitate updating firmware of the devices in the cloud infrastructure 110. The virtualization management system 102 may also be tasked with identifying and integrating new devices into the cloud infrastructure 110.

Thus, the virtualization management system 102 system is responsible for a multitude of tasks, and the virtualization management system 102 provides multiple interfaces to perform each of these tasks. Hence, system level testing of such multi-interface dynamic infrastructure where a complex customer change window takes place is challenging. The one or more embodiments of the present invention described herein test the multi-interface virtual management system 102 using automated testing that includes stress-testing the cloud infrastructure 110 managed by virtualization management system 102. Further yet, the one or more embodiments of the present invention described herein emulate and test the enterprise system 102 by executing an arbitrary mixture of multi-interface, multi-platform virtualization management functionalities in a heterogeneous cloud-based infrastructure.

Figure 4:
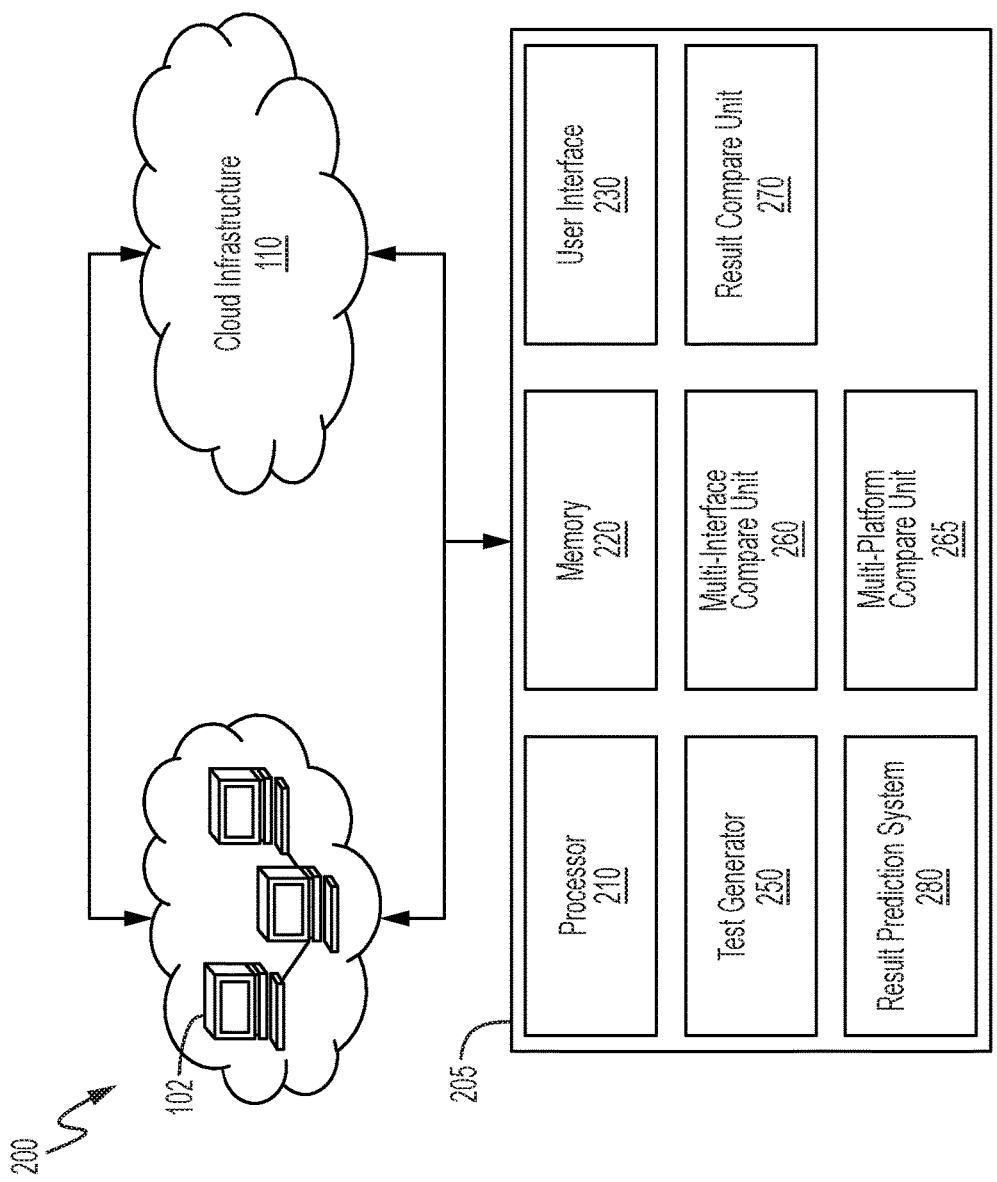
FIG. 4 illustrates an example test server in accordance with one or more embodiments of the present invention.

FIG. 4 illustrates an example testing environment 200 for testing the virtualization management system 102 and the heterogeneous cloud infrastructure 110. The testing environment 200 includes a test server 205 that communicates with both the virtualization management server 102 and the cloud infrastructure 110. The test server 205 includes, among other components, a processor 210, a memory 220, a user interface 230, a test generator 250, a multi-interface compare unit 260, and a result compare unit 270, and a multi-platform compare unit 265. In an example, the test generator 250, the multi-interface compare unit 260, the multi-platform compare unit 265, and the result compare unit 270 are program modules that include computer executable instructions that are executable by the processor 210.

The processor 210 is a central processor of the test server 205 and may be responsible for the execution of an operating system, control instructions, and applications installed on the test server 205. The processor 210 may be one or more devices operable to execute logic. The logic includes computer executable instructions or computer code embodied in the memory 220 or in other memory that when executed by the processor 210, cause the processor 210 to perform the features implemented by the logic. The computer code includes instructions executable with the processor 210. The computer code includes embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code includes source code and/or compiled code. The processor 210 may be a general processor, central processing unit, server, application specific integrated circuit (ASIC), digital signal processor, field programmable gate array (FPGA), digital circuit, analog circuit, or combinations thereof. The processor 210 is in communication with the memory 220 and the other components of the test server 205.

The memory 220 is non-transitory computer storage medium. The memory 220 may be DRAM, SRAM, Flash, or any other type of memory or a combination thereof. The memory 220 stores control instructions and applications executable by the processor 210. The memory 220 contains other data such as images, videos, documents, spreadsheets, audio files, and other data that may be associated with operation of the test server 205.

The test server 205 includes a user interface 230 that facilitates issuing commands to the test server 205. For example, a tester may initiate the testing by the test server 205 via the user interface 230.

Figure 5:
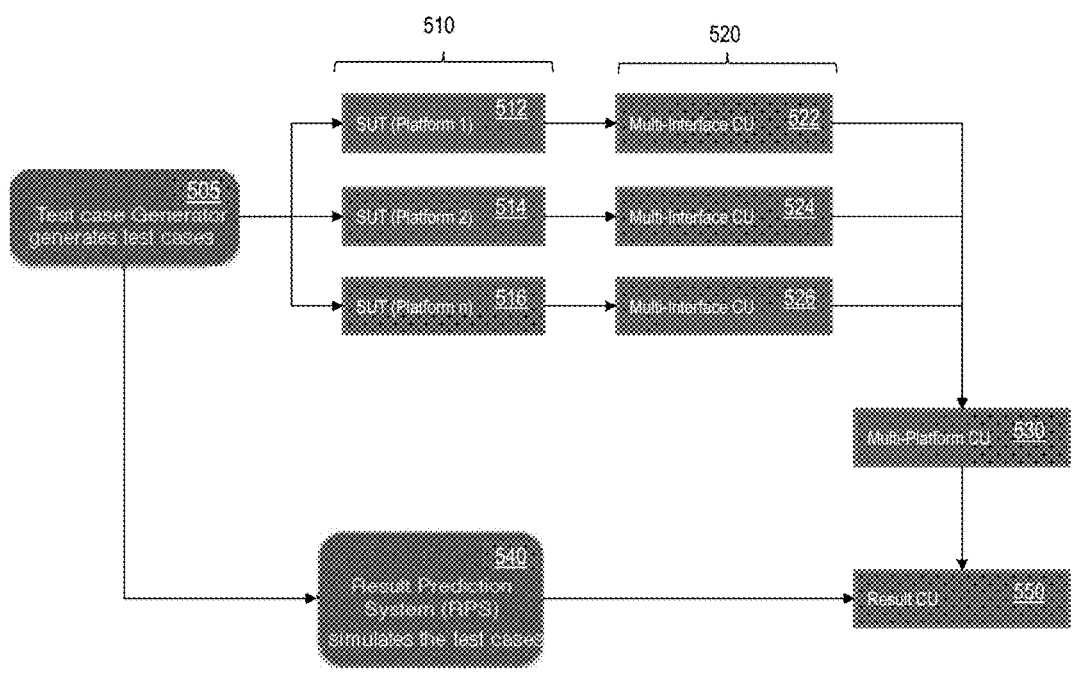
FIG. 5 illustrates example logic used by a test server to test multiple instances of the system under test (SUT) being executed on a virtualization management system in accordance with one or more embodiments of the present invention.

FIG. 5 illustrates example logic used by the test server 205 to test multiple instances of the system under test (SUT) being executed on the virtualization management system 102, according to one or more embodiments of the present invention. For example, the SUT is a computer application being executed by the virtualization management system 102 on different platforms 1-$n$, each platform having a different combination of operating system and hardware on which the SUT 510 is being executed.

The test generator 250 generates test cases that stress, scale, and performance test the SUT, as shown at block 505. For example, the test generator 250 is a pseudo-random test case generator. In an example, the test generator 250 generates a random string of valid multi-interface functionalities where each function can appear within the string one or more times. The test generator 250 generates multiple such strings, each string being a separate test case. There are no dependencies among the generated functionalities in the strings and, therefore, the test case generation is allowed to include functionalities that could return bad return codes. For example, a multi-interface function "RemoveHost" may be the first command in the generated string. In this case, the machine is expected to respond a return code indicating that there are no hosts to be removed (since the first command is to remove a host without loading one).

The processor 210 sends the strings of multi-interface functions to each of the SUT instances, which is being executed by the virtualization management system 102, as shown at 512, 514, and 516. The processor 210 further sends the strings to the result predictor 280, as shown at 540. Each test case tests multiple interfaces of each of the SUT instances, as shown at 522, 524, and 526.

Figure 6:
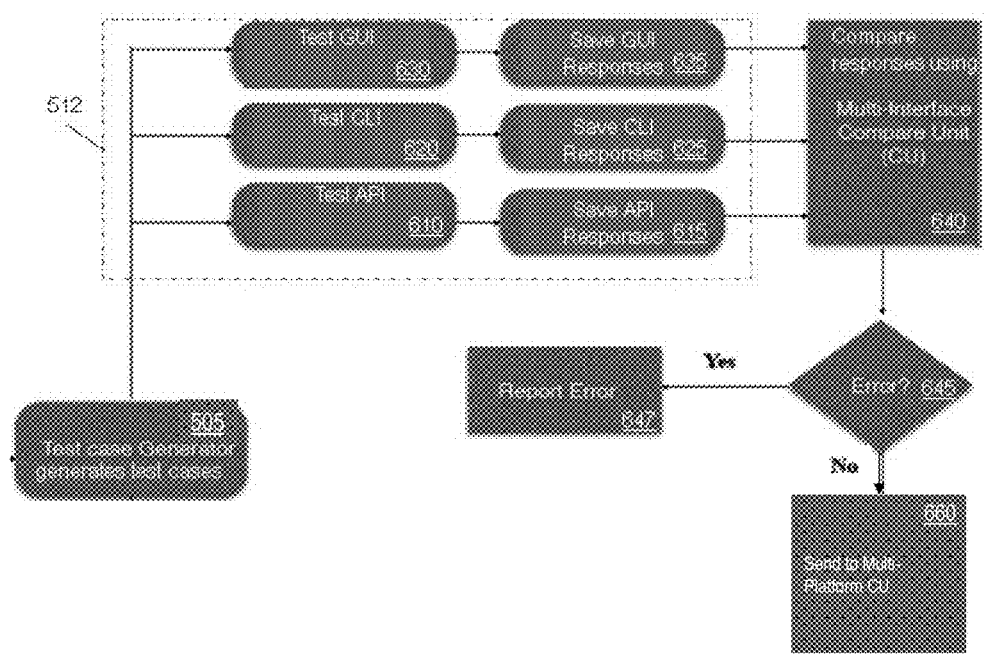
FIG. 6 depicts comparing test results from multiple interfaces of a single SUT instance in accordance with one or more embodiments of the present invention.

FIG. 6 depicts comparing the test results from the multiple interfaces of a single SUT instance, such as at the block 512, according to one or more embodiments of the present invention. Referring to FIG. 6, test results from multiple interfaces of the SUT 512 are compared by a corresponding multi-interface compare unit 260, as shown at blocks 610, 620, and 630. In the illustration, the GUI, the CLI, and the API of the SUT are tested. It should be noted that in other examples, fewer, additional, and/or different interfaces of the SUT may be tested than those illustrated here. The functions listed in the string of the test cases are implemented by the SUT via each of the interfaces. The multi-platform compare unit 265 receives the results for the tests cases from each of the interfaces of the SUT tested, as shown at blocks 615, 625, and 635.

The multi-interface compare unit 260 compares results from all the interfaces of the SUT, as shown at block 640. The multi-interface compare unit 260 compares the results from each interface to determine if the results are substantially identical, or within a predetermined threshold of each other. If the results are not within the predetermined range, the multi-interface compare unit 260 determines and reports an error, as shown at blocks 645 and 647. In one or more examples, in the case of error, the execution of the test is stopped, and a subsequent test may be executed. In an example, the response file corresponding to the SUT is appended with results from the multiple interfaces of the SUT only if the multi-interface compare unit 260 does not encounter an error. The test results from the multiple interfaces of the SUT instance are then sent to the multi-platform compare unit 265, as shown at 660. In one or more examples, the test results are forwarded in the form of the response file.

Figure 7:
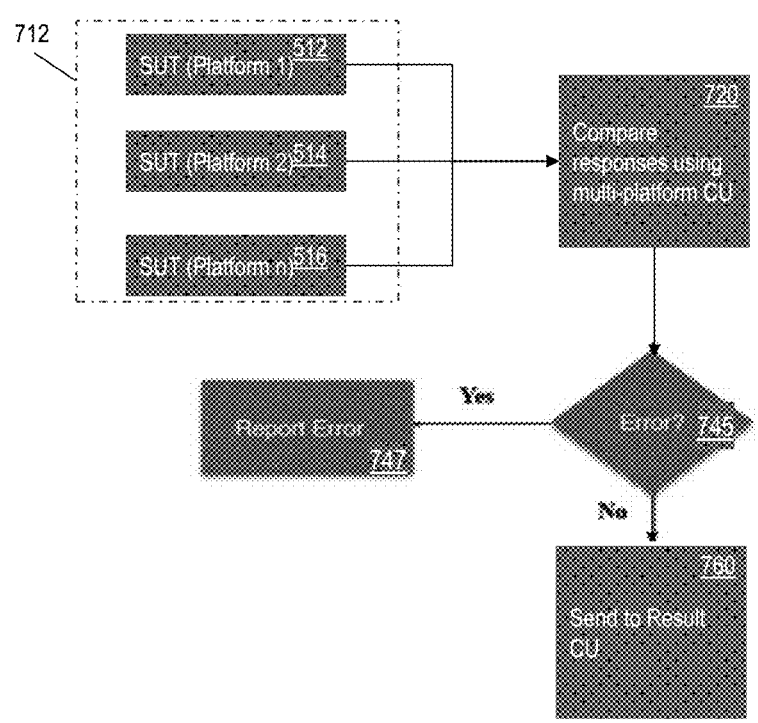
FIG. 7 illustrates the data flow and logic used by a multi-platform compare unit upon receipt of the responses in accordance with one or more embodiments of the present invention.

Referring back to FIG. 5, the multi-platform compare unit 265 receives the responses from the multiple instances of the SUT from the corresponding platforms, as shown at 530. FIG. 7 illustrates the data flow and logic used by the multi-platform compare unit 265 upon receipt of the responses, according to one or more embodiments of the present invention. As depicted in FIG. 7, the SUT instances being executed on multiple platforms send their test responses to the multi-platform compare unit 265, as shown at 712. As described herein, an SUT instance forwards the test response only if the multi-interface compare unit 260 corresponding to that SUT instance does not raise an error (FIG. 6). The multi-platform compare unit 265 compares the test response from the multiple platforms to check if the test response are within a predetermined threshold of each other or within a predetermined range. For example, the multi-platform compare unit 265 compares the test responses from each platform to determine if the responses are substantially identical. Alternatively, the multi-platform compare unit 265 compares the test responses from each platform to determine if the responses are within an allowable threshold of each other. The predetermined threshold used by the multi-platform compare unit 265 may be different from the predetermined threshold used by the multi-interface compare unit 260.

If the test responses from each of the multiple platforms are not within the predetermined range, the multi-platform compare unit 265 determines and reports an error, as shown at blocks 745 and 747. In one or more examples, in the case of error, the execution of the test is stopped, and a subsequent test may be executed. In an example, the response file corresponding to the SUT is appended with an indication from the multi-platform compare unit 265 that the responses matched those from other SUTs. The test responses from the multiple platforms are then sent to the result compare unit 270, as shown at 760. In one or more examples, the test results are forwarded in the form of the response file with the indication appended from the multi-platform compare unit 265.

Referring back to FIG. 5, the result compare unit 270 receives the test response from the multi-platform compare unit 265 and the result predictor 280. In one or more examples, the result predictor 280 identifies the expected results for the generated test cases. For example, the result predictor 280 simulates the cloud infrastructure 110 under test and further simulates the execution of the test cases, as shown at block 540. In an example, the result predictor 280 executes each test case for each of the multiple interfaces provided by the SUT. Alternatively, or in addition, the result predictor 280 executes each test case for each of the multiple platforms supported by the SUT. The simulation of each multi-interface function of the test case is based on the initial values as well as previously executed function. For example, if a number of consecutive multi-interface 'AddHost' functions are executed, the simulation unit keeps the list of unique and valid hosts that exist in the pool at any given time. The virtualization management system 102 uses Unique Object ID (UOID) or Global Unique ID (GUID) for each object in the cloud infrastructure 110, such as host servers. The test server 205 uses the UOID property to keep track of the valid hosts that exist in the pool (cluster).

In one or more examples, the test server 205 captures and stores results from the result predictor 280 in response files. In an example, results from the multi-interface SUT are appended into the response files, after (or before) the results from the result predictor 280. Alternatively, the test servers 205 maintains two separate response files, one for results from the result predictor 280 and one for results from the SUT instances. In an example, for each possible function per interface of an SUT instance, the test server 205 creates two files (response files) that are updated each time the function is executed. The results from the SUT instance and RPS are appended to their respective files.

Figure 8:
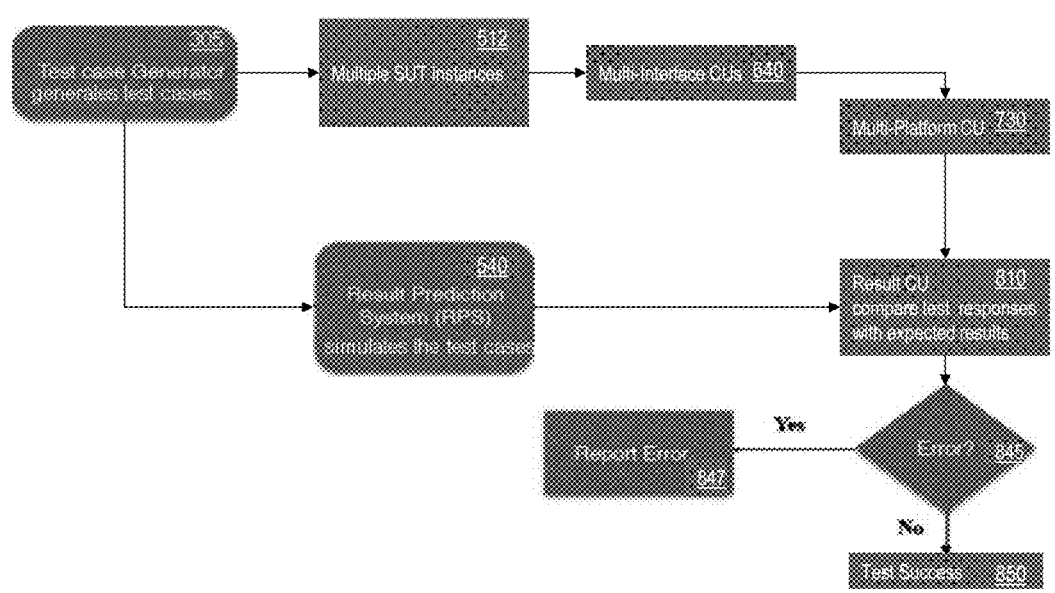
FIG. 8 illustrates a data flow and logic used by a result compare unit to check if the test responses from the SUT instances match expected results from a result predictor in accordance with one or more embodiments of the present invention.

FIG. 8 illustrates a data flow and logic used by the result compare unit 270 to check if the test responses from the SUT instances match expected results from the result predictor 280, according to one or more embodiments of the present invention. The result compare unit 270 compares all the accumulated multi-interface responses in the response file for the SUT instances from the different platforms to those returned by the result predictor 280, to determine respective outcomes of the test cases, as shown at block 810. For example, at the end of the test case execution, the response file(s) is (are) parsed to determine the presence of keywords (such as UOID or GUID) for both the SUT instance and the result predictor 280. For example, in the case of two files, one for each of the SUT instance and the result predictor 280, the result compare unit 270 scans both files to identify the presence of a keyword. If the result compare unit 270 determines an error when scanning the responses for a test case, then the result compare unit 270 reports an error for the test case, as shown at blocks 845 and 847. For example, if an expected keyword response is not present in the file corresponding to the SUT, the file that contains actual results, and is present in the file corresponding to the result predictor 280 (or vice versa), then the result compare unit 270 reports an error. Alternatively or in addition, the result compare unit 270 reports an error if a response in the file for the SUT instance is different from a corresponding response in the file for the result predictor 280.

Thus, the automated testing emulates and tests the virtualization management system 102 by executing an arbitrary mixture of multi-interface and multi-platform virtualization management functionalities in the heterogeneous cloud-based infrastructure 110. For example, the test string tests a data server of the multi-interface virtualization management system 102 through a complex hostile environment that is anchored from a first platform (server, storage, and network administrator) perspective, and further tests consistency between the test responses from the first platform with those from a second platform.

Table 2 lists an example sequence of operations to test the multiple instances of an SUT being executed by the virtualization management system 102 on different platforms in this manner.

TABLE 2

MIF = Multi-interface functions: A list of randomly generated multi-interface functions. Each function has its multi-interface version generated such as GUI, CLI, and API.
ARC[j][i] = actual response of function i from SUT on platform j
ERC[i] = expected response for function i from result predictor
1. Generate n number of MIFs; where n is a random number and MIF is the list of generated multi-interface functions. Each generated function includes multiple versions corresponding to each interface supported by the SUT.
2. For each SUT instance being executed by corresponding platform
    a. Execute all the MIF versions
        i. Compare the responses of each function from multiple interface versions (GUI, CLI, API)
        ii. If no error, continue to next step b; otherwise report an error for incompatible responses between the different interfaces
    b. Select one or more responses from the multiple versions and append selected response in a response file for SUT instance.
3. For each platform supported by the SUT
    a. Compare responses of each function from the multiple platforms
    b. If no error, continue to next step c; otherwise report an error for incompatible response between the different platforms
    c. Select one or more responses from the multiple platforms and append selected response in a
4. For each test case with ARC and ERC
    a. Compare responses for the SUT with expected responses from the result predictor
    b. If no error continue to next test case; otherwise report an error for the test case The above implementation allows local tweaks at each of the compare units—the multi-interface compare unit 260, the multi-platform compare unit 265, and the result compare unit 270—to implement unique results comparison logics for different types of interface and platforms. For example, a local tweak may include setting a first predetermined threshold at the multi-interface compare unit for comparing test responses from multiple interfaces of the same SUT instance for a specific test case, while setting a different second predetermined threshold for comparing test responses from multiple SUT instances for the specific test case.

Figure 9:
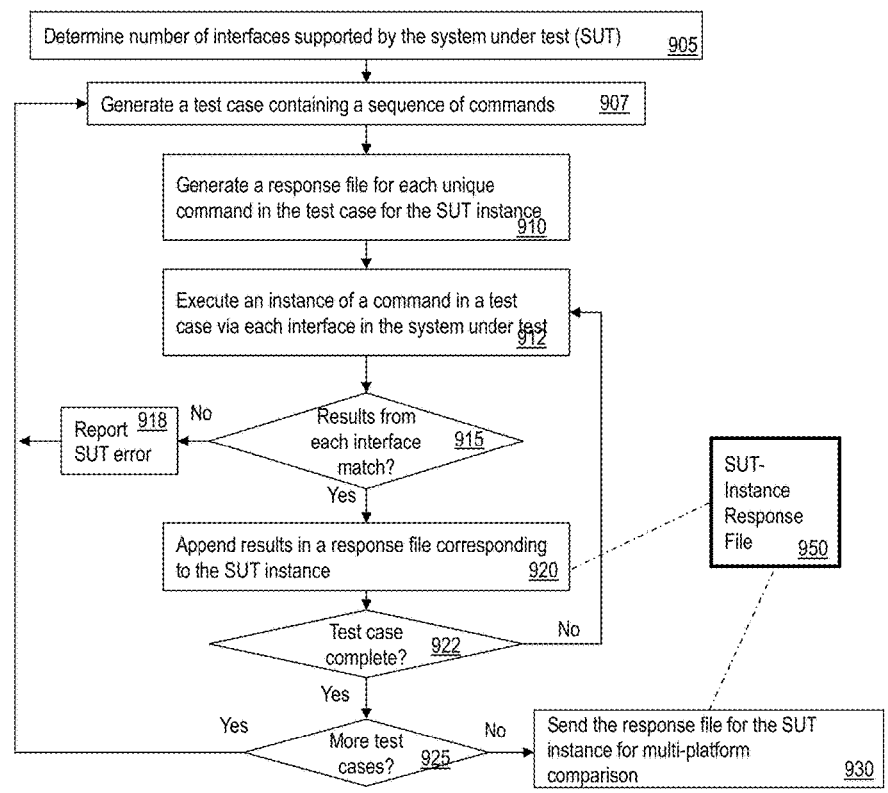
FIG. 9 illustrates a flowchart of an example method for determining compatibility between test responses from multiple interfaces of a single instance of a SUT in accordance with one or more embodiments of the present invention.

FIG. 9 illustrates a flowchart of an example method for determining compatibility between the test responses from the multiple interfaces of a single instance of the SUT, according to one or more embodiments of the present invention. The logic may be implemented by the test server 205. The test server 205 determines the number of interfaces supported by the SUT, as shown at block 905. In one or more examples, a user may input the number of interfaces. The test server 205 generates one or more test cases, as shown at block 907. The test case includes a sequence of instances of commands executable by the SUT using the multiple interfaces supported by the SUT (GUI, CLI, API etc.).

In one or more examples, the test server 205 generates a response file for each unique command in the test case. For example, the test server 205 generates a first response file corresponding to a command tested by a first interface of the SUT, and a second response file corresponding to the command tested by a second interface of the SUT, as shown at blocks 910. Each instance of the commands in the test case is executed by each interface of the SUT, as shown at blocks 912. The test server 205 sends the test case to each interface that is supported by the SUT.

The test server compares the results from each interface of the SUT, as shown at block 915. If the results from each interface do not match each other according to a predetermined criteria, such as being identical, the test server 205 reports an error, as shown at blocks 918. For example, the error is reported as an email, as a prompt on a display, an audible, or in any other manner. Alternatively, if the results from each interface match, the test responses from the SUT are appended to a response file corresponding to the SUT instance, as shown at block 920. For example, the test server maintains an SUT-instance response file 950 that the test server 205 further uses for comparing the response across multiple platforms. In one or more examples, the test server 205 appends responses from each of the interface in the SUT-instance response file 950. Alternatively, in one or more examples, the test server 205 selects an interface from the multiple interfaces from which the test responses are appended into the SUT-instance response file 950. For example, the interface is selected randomly. Alternatively, in one or more examples, the interface is selected based on a predetermined choice from a user. In one or more examples, the test server 205 maintains multiple SUT-instance response files 950, one for each unique command being tested.

If all commands in the test case are not executed (i.e. tested), the test server 205 continues to test further instances of the commands in the test case, as shown at block 922. The test server 205 generates and tests other tests cases to completely test the SUT, as shown at block 925. Further, once all test cases are executed, the test server 205 sends the SUT-instance response file(s) for multi-platform comparison, as shown at 930.

For example, assume that the test server 205 is testing the effect and results of the functions of AddHost (AH), RemoveHost (RH) and ListHost (LH) across multiple interfaces of the SUT instance. Here, AH-x represents AddHost x and RH-y represents RemoveHost y. Consider that a generated random command string for a test case is RH-A->RH-D->LH->AH-C->LH->RH-C->LH. The test server 205 sends the command string to the SUT instance via each interface supported by the SUT, and the result predictor 280, which execute the commands listed in that sequence. The test server 205 appends the responses after each command and appends the responses to the respective response files as described herein.

The multi-interface compare unit 260 compares the response from the multiple interfaces for each function for compatibility, to check if they all produce identical responses or at least responses within a predetermined range. For example, the multi-interface compare unit 260 determines if the AddHost(H) versions of GUI, CLI, and API interfaces all report successful results. Subsequently, the response of the SUT to each function is parsed and checked for keywords such as UOID and GUID. The response is appended to the response file corresponding to the function for the SUT instance.

Figure 10:
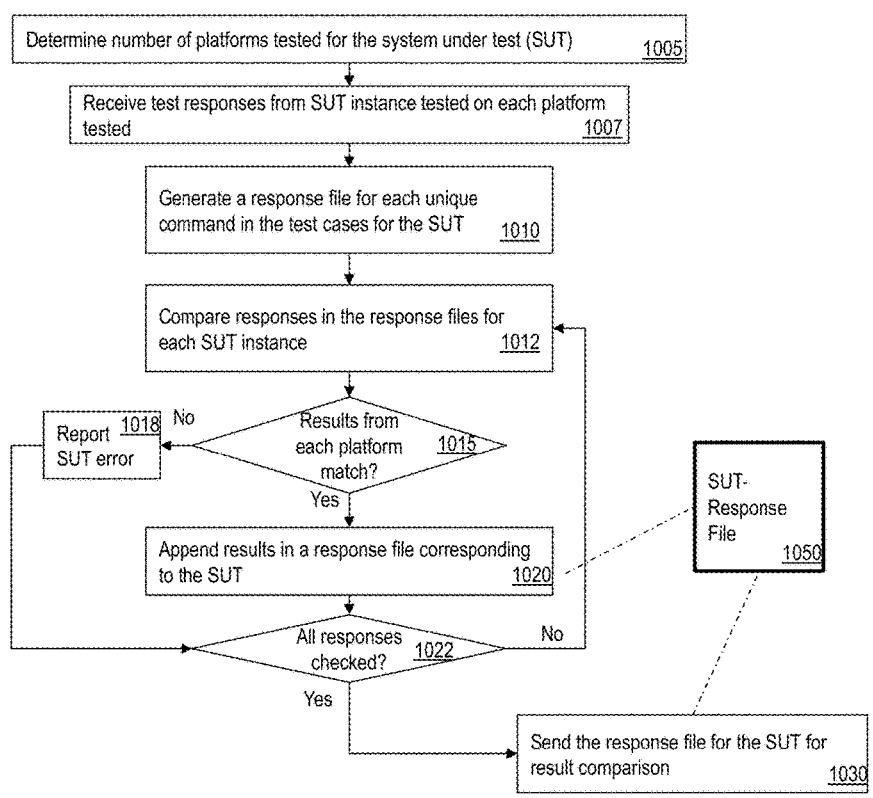
FIG. 10 illustrates a flowchart of an example method for determining compatibility between test responses from multiple platforms of a SUT in accordance with one or more embodiments of the present invention.

FIG. 10 illustrates a flowchart of an example method for determining compatibility between the test responses from the multiple platforms of the SUT, according to one or more embodiments of the present invention. The logic may be implemented by the test server 205. The test server 205 determines the number of platforms being tested for the SUT, as shown at block 1005. In one or more examples, a user inputs the number of platforms being tested. The test server 205 receives multiple responses from each of the platforms on which the SUT instance is being executed, as shown at block 1007. In one or more examples, the responses are received as the response files for each of the SUT instances of the platforms. In one or more examples, the response file is the SUT-instance response file 950. The response file includes a sequence of responses to instances of commands executable by the SUT. In one or more examples, each response files includes responses to the commands executed by the corresponding SUT instance using the multiple interfaces supported by the SUT (GUI, CLI, API etc.). In one or more examples, the test server 205 receives multiple response files from a single SUT instance, where each response file corresponds to each unique command tested. The response file includes multiple responses from each interface for the corresponding unique command tested.

The test server 205 generates a response file for each unique command in the test cases for the multi-platform SUT test, as shown at 1010. The response file may be the SUT response file 1050 described further. In one or more examples, the SUT response file 1050 includes multiple response files. The test server 205 compares responses in the response files for each SUT instance, as shown at 1012. The test server 205 checks if the results from each platform match each other according to a predetermined criteria, such as being identical, as shown at 1015. If the results do not match each other, the test server 205 reports an error, as shown at blocks 1018. Alternatively, if the results from each platform match, the test responses from the SUT are appended to a response file corresponding to the SUT, as shown at block 1020. For example, the test server 205 maintains a SUT response file 1050 that the test server 205 further uses for comparing the responses with the result predictor 280. In one or more examples, the test server 205 appends responses from each of the platforms in the SUT response file 1050. Alternatively, in one or more examples, the test server 205 selects a platform from the multiple platforms from which the test responses are appended into the SUT response file 1050. For example, the platform is selected randomly. Alternatively, in one or more examples, the platform is selected based on a predetermined choice from a user. In one or more examples, the test server 205 maintains multiple SUT response files 1050, one for each unique command being tested.

If all responses in the response file are not compared (i.e. tested), the test server 205 continues to test further responses, as shown at block 1022 and 1012. Once all the test responses are compared, the test server 205 sends the SUT response file 1050 for result comparison, as shown at 1030.

For example, assume that the test server 205 is testing the effect and results of the functions of AddHost (AH), RemoveHost (RH) and ListHost (LH) across multiple platforms of the SUT. Here, AH-x represents AddHost x and RH-y represents RemoveHost y. Consider that a generated random command string for a test case is RH-A->RH-D->LH->AH-C->LH->RH-C->LH. The test server 205 sends the command string to the SUT instances on each platform being tested, and the result predictor 280, which execute the commands listed in that sequence. The test server 205 appends the responses after each command and appends the responses to the respective SUT-instance response files as described herein. The multi-interface compare unit 260 checks that the multiple interfaces of each SUT instance executing on multiple platforms match each other. Each SUT instance further forwards SUT-instance response files 950 to the multi-platform compare unit 265.

The multi-platform compare unit 265 compares the response from the multiple platforms for each function for compatibility, to check if they all produce identical responses or at least responses within a predetermined range. For example, the multi-platform compare unit 265 determines if the AddHost(H) versions of the multiple platforms all report successful results. Subsequently, the response of the SUT to each function is parsed and checked for keywords such as UOID and GUID. The response is appended to the response file corresponding to the function for the SUT.

Figure 11:
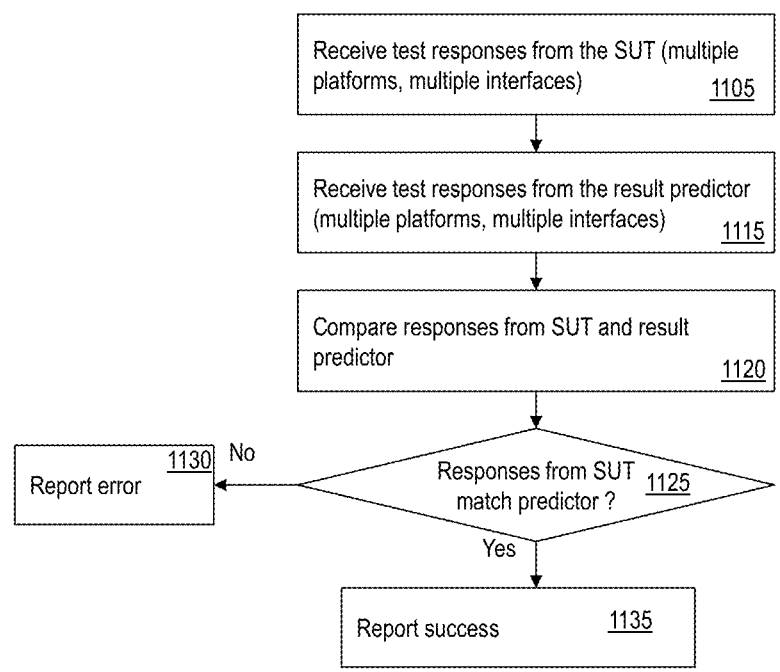
FIG. 11 illustrates a flowchart of an example method for determining compatibility between test responses from multiple platforms of a SUT and expected test responses in accordance with one or more embodiments of the present invention.

FIG. 11 illustrates a flowchart of an example method for determining compatibility between the test responses from the multiple platforms of the SUT and expected test responses, according to one or more embodiments of the present invention. The logic may be implemented by the test server 205. The test server 205 receives test responses from the SUT (multiple platforms, multiple interfaces), as shown at 1105. In one or more examples, the responses from the SUT are received in the form of the SUT response file 1050, which contains response from multiple SUT platforms, and have been confirmed by the multi-platform compare unit 265 to be matching each other. Further yet, the multi-compare units 260 for each SUT instance have confirmed that the responses from each interface of each of the SUT instances match each other.

The test server 205 further receives test responses from the result predictor 280 (multiple platforms, multiple interfaces), as shown at 1115. In one or more examples, the result predictor generates a response file that also includes responses for each interface and for each platform being tested. For example, as described herein, the test server 205 sends to the result predictor 280, all the test cases that were executed by the SUT.

The result compare unit 270 compares the responses from the SUT and the responses from the result predictor 280, as shown at block 1120. For example, the test server 205 compares the responses that are stored in the SUT response file 1050 and a second response file generated by the result predictor 280, as shown at 1125. If the responses in the two files do not match each other, for example, are not identical, the test server 205 reports an error, as shown at blocks 1132 and 1130. The test server 205 parses the response files to compare the responses based on object identifiers that the test server 205 assigns to each object in the virtualization management system 102. For example, each server, each cluster, each virtual machine, or any other component in the cloud infrastructure 110 is assigned a unique identifier. If the responses match, the test server 205 reports success, as shown at 1125 and 1135.

The above described technical features facilitate local tweaks at each compare units, to implement unique results comparison logics for different types of interface and platforms. If no such logics are required, an alternative implementation is by having a single compare unit to compare results from all interfaces and platforms and from the result predictor 280.

Figure 12:
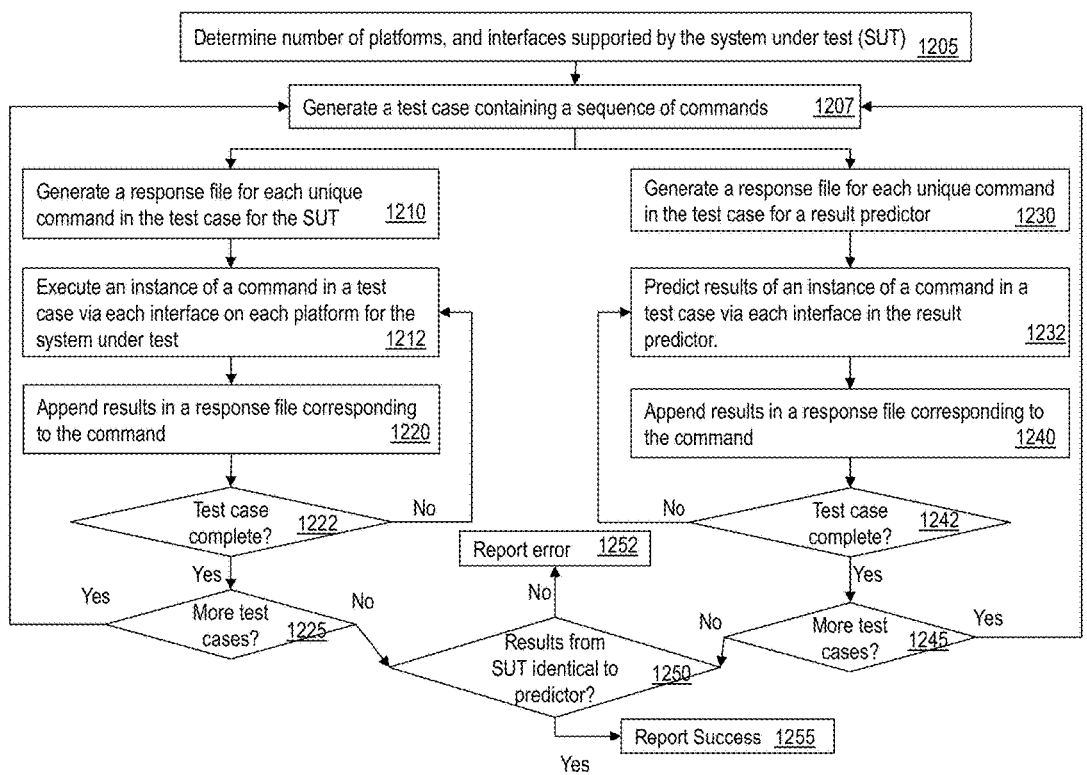
FIG. 12 illustrates a flowchart for testing a SUT in accordance with one or more embodiments of the present invention.

FIG. 12 illustrates a flowchart for testing the SUT according to one or more embodiments of the present invention. The logic may be implemented by the test server 205. The test server 205 determines the number of interfaces supported by the SUT and the number of platforms to test the SUT on, as shown at block 1205. In another example, a user may input the number of interfaces and platforms. The test server 205 generates one or more test cases, as shown at block 1207. The test case includes a sequence of instances of commands executable by the SUT. In one or more examples, the test server 205 selects a subset of the interfaces supported by the SUT that are to be tested. For example, the test server 205 tests only the GUI and the API of the SUT, which additionally supports the CLI. Other combinations are of course possible. In an example, a user inputs the interfaces that are to be tested. Similarly, and alternatively or in addition, the test server 205 selects a subset of the platforms to test the SUT on.

The test server 205 executes the test case that was generated using each of the selected interface and selected platform to be tested, as shown at block 1212. The test server 205 generates a first response file for each command for the SUT as described herein, as shown at 1210. The test server 205 executes an instance of a command in a test case via each interface on each platform for the SUT and stores each of the responses in the first response file corresponding to the command, as shown at 1212 and 1220.

In addition, the test server 205 generates a second response file for each command for the SUT using the result predictor 280, as shown at 1230. The test server 205 predicts results of the test case for each selected interface to be tested using the result predictor 280, as shown at block 1232. The result predictor 280 appends the responses for each command in the second response file, as shown at 1240.

The test server 205 ensures that all the command instances from the test case are executed, by the SUT instances and the result predictor 280, as shown at 1222 and 1242.

In case additional test cases are to be executed and/or predicted, the test server 205 repeats the above process, as shown at blocks 1225 and 1245. In an example, the user indicates a maximum number of test cases that are to be used to test the virtualization management system 102. Alternatively, the maximum number of tests cases is a predetermined value or a randomly generated value in other examples.

Once the maximum number of test cases are completed, the test server 205 compares the results for each command from the SUT and the result predictor 280, as shown at block 1250. For example, the result compare unit 270 compares the results that are stored in the first response file and the second response file. If the results in the two files are not identical, the test server 205 reports an error, as shown at block 1252. In this case, the first and second response files include results for each of the selected interfaces and not all of the interfaces that are supported by the SUT. Else, if results from the SUT are identical to those from the result predictor 280, the test server 205 reports that the test case succeeded or passed, as shown at 1255.

In the example test case described above, the expected responses are that the first two functionalities in the string return invalid return codes since there are no hosts to be removed from the pool. The list host function should indicate an empty set. The second LH function should indicate host C to be in the pool and the last LH function should show an empty list of pool since host C removed.

The result predictor 280 uses accumulated state of the pool and simulates results for each multi-interface function. For example, the result predictor 280 initializes a pool with an empty set of valid hosts in the pool. Accordingly, during simulation, the first two functions (RH) return invalid response codes since the pool is empty in both cases. The first LH function looks at the set of valid pool and finds it empty. The test server 205 collects and stores the response from the simulations by the result predictor 280 in a corresponding response file for the function.

The result compare unit 270 parses the corresponding response files returned by the SUT and result predictor 280. The result compare unit 270 checks that each entry pair of the response files is consistent and indicates proper (expected) responses. Accordingly, the number of entries in each of the corresponding response files is the same for the results to match without an error. For example in this case, for each SUT instance, the LH response file in both, the SUT and the result predictor should include 9 (nine) entries (three entries*three interfaces), since the LH command was executed three times and the SUT in the example supports three interfaces (API, CLI, and GUI).

Thus, the technical solutions described herein facilitate testing multiple interfaces of a SUT functionalities by orchestrating to emulate a scaled up cloud infrastructure that supports arbitrary concurrent multi-end users. The technical solutions emulate and test the SUT by executing arbitrary mixture of multi-interface, multi-platform virtualization management functionalities in a heterogeneous cloud-based infrastructure.

The present invention may be a system, a method, and/or a computer program product at any possible technical detail level of integration. The computer program product includes a computer-readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for automated testing of a system under test, the system comprising:

a memory; and a processor configured to:

send a test case to a plurality of instances of the system under test, the test case sent to each instance of the system under test via each interface from a plurality of interfaces supported by the system under test, wherein the test case comprises a plurality of instances of commands executable by each instance of the system under test;

for each instance of the system under test, perform multi-interface comparison by:

comparing responses to the test case from each of the interfaces; and in response to the responses from each of the interfaces being identical, storing the responses in an instance-response file corresponding to the instance;

generating a response file corresponding to each of the plurality of commands in the test case; and in response to the responses from each of the interfaces of each instance of the system under test being identical, storing the responses in the response file corresponding to the command; and report an error in response to the responses from each interface not being identical.

2. The system of claim 1, wherein the instances of the commands in the test case include a first instance of a command and a second instance of said command, and wherein the responses of the second instance of the command executed via an interface are appended in the response file corresponding to the command, wherein the response file contains results of the first instance of the command executed via said interface.

3. The system of claim 1, the processor being further configured to:

in response to the responses from each interface of the instance of the system under test being identical:

send the instance-response file from each of the instances of the system under test to a multi-platform comparison unit;

for each instance of the system under test, perform multi-interface comparison by:

comparing responses to the test case from each of the instances; and in response to the responses from each of the instances being identical, storing the responses in a system-response file; and report an error in responses to the responses from each instance not being identical.

4. The system of claim 3, the processor further configured to:

send the test case to a result predictor unit, for generation of a predictor-response file comprising simulated responses for the test case;

compare responses to the test case from the system-response file and the predictor-response file;

in response to the responses from the predictor-response file and the system-response file being identical, report that the test case passed; and report an error in response to the responses from the predictor-response file and the system-response file not being identical.

5. A computer program product for automated testing of a system under test, the computer program product comprising a computer readable storage medium having program instructions embodied therewith, the program instructions executable by a processing circuit to cause the processing circuit to:

send a test case to a plurality of instances of the system under test, the test case sent to each instance of the system under test via each interface from a plurality of interfaces supported by the system under test, wherein the test case comprises a plurality of instances of commands executable by each instance of the system under test;

for each instance of the system under test, perform multi-interface comparison by:

comparing responses to the test case from each of the interfaces; and in response to the responses from each of the interfaces being identical, store the responses in an instance-response file corresponding to the instance;

generating a response file corresponding to each of the plurality of commands in the test case; and in response to the responses from each of the interfaces of each instance of the system under test being identical, storing the responses in the response file corresponding to the command; and report an error in response to the responses from each interface not being identical.

6. The computer program product of claimer 5, wherein the instances of the commands in the test case include a first instance of a command and a second instance of said command, and wherein the responses of the second instance of the command executed via an interface are appended in the response file corresponding to the command, wherein the response file contains results of the first instance of the command executed via said interface.

7. The computer program product of claim 5, wherein the program instructions are further executable to cause the processing circuit to:

in response to the responses from each interface of the instance of the system under test being identical:

send the instance-response file from each of the instances of the system under test to a multi-platform comparison unit;

for each instance of the system under test, perform multi-interface comparison by:

comparing responses to the test case from each of the instances; and in response to the responses from each of the instances being identical, storing the responses in a system-response file; and report an error in response to the responses from each instance not being identical.

* * * * *